(12) United States Patent
Bhanage et al.

(10) Patent No.: US 9,124,547 B2
(45) Date of Patent: Sep. 1, 2015

(54) SYSTEM AND METHOD FOR ENFORCING UPLINK WIRELESS MEDIUM USAGE IN WIRELESS NETWORKS

(75) Inventors: Gautam Dilip Bhanage, Sunnyvale, CA (US); Sachin Ganu, San Jose, CA (US); Partha Narasimhan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 13/563,630

(22) Filed: Jul. 31, 2012

(65) Prior Publication Data

US 2014/0036893 A1    Feb. 6, 2014

(51) Int. Cl.
| | |
|---|---|
| *H04W 84/12* | (2009.01) |
| *H04L 29/06* | (2006.01) |
| *H04W 4/26* | (2009.01) |
| *H04W 28/02* | (2009.01) |
| *H04L 12/801* | (2013.01) |
| *H04L 12/807* | (2013.01) |
| *H04W 72/04* | (2009.01) |
| *H04L 12/24* | (2006.01) |

(52) U.S. Cl.
CPC .............. *H04L 69/00* (2013.01); *H04L 47/193* (2013.01); *H04L 47/27* (2013.01); *H04L 63/00* (2013.01); *H04L 69/16* (2013.01); *H04W 4/26* (2013.01); *H04W 28/0205* (2013.01); *H04L 41/0893* (2013.01); *H04L 63/1408* (2013.01); *H04W 72/0486* (2013.01)

(58) Field of Classification Search
CPC ......... G06F 15/173; H04B 7/216; H04L 1/00; H04L 12/28; H04M 11/00; H04Q 7/24; H04W 4/00; H04W 4/26; H04W 24/02; H04W 84/12

See application file for complete search history.

(56) References Cited

U.S. PATENT DOCUMENTS

| | | | |
|---|---|---|---|
| 8,045,465 B2* | 10/2011 | Coupechoux et al. | 370/232 |
| 2007/0025289 A1 | 2/2007 | Nandagopalan | |
| 2009/0059873 A1 | 3/2009 | Weil et al. | |
| 2010/0111056 A1 | 5/2010 | Schmitt et al. | |
| 2011/0058478 A1 | 3/2011 | Krym et al. | |
| 2012/0166622 A1 | 6/2012 | Draznin et al. | |

(Continued)

OTHER PUBLICATIONS

Kashibuchi, Kenichi et al., "Channel Occupancy Time Based Top Rate Control for IEEE 802.11 DCF", Graduate School of Information Sciences, Tohoku University, Sendai, Miyagi, Japan, 980-8579, 2008 IEEE. 6 pages.

(Continued)

*Primary Examiner* — Andrew Lai
*Assistant Examiner* — Leon Andrews

(57) ABSTRACT

The present disclosure discloses a method and network device for enforcing uplink airtime fairness in wireless local area networks. The disclosed network device receives usage limits associated with transmissions from one or more client devices. The client devices transmit packets to the network device via one or more uplink wireless mediums. The disclosed network device further collects wireless medium usage times associated with the client devices, and calculates a size for transmission windows corresponding to the client devices based on the wireless medium usage times and the usage limits. The transmission windows can be TCP advertisement windows whose size determines a rate of transmissions permitted over the wireless medium. Then, the disclosed network device sets the transmission window to the calculated size.

24 Claims, 11 Drawing Sheets

(56) References Cited

U.S. PATENT DOCUMENTS

2013/0094486 A1 4/2013 Bhanage et al.
2014/0094159 A1* 4/2014 Raleigh et al. ............... 455/418

OTHER PUBLICATIONS

Xu, Yuedong et al., "Balancing Throughput and Fairness for TCP Flows in Multihop Ad-Hoc Networks", Department of Computer Science & Engineering & Department of Information Engineering, The Chinese University of Hong Kong, 2007; pp. 1-15.

Ha, Juho et al., "TCP Fairness for Uplink and Downlink Flows in WLANs", School of Electrical Engineering and Computer Science, and ASRI, Seoul National University, Seoul, Korea, 2006 IEEE, 5 pages.

Floyd, Sally et al., "Modifying TCP's Congestion Control for High Speeds", May 5, 2002, pp. 1-5.

Keceli, Feyza et al., "TCP ACK Congestion Control and Filtering for Fairness Prevision in the Uplink of IEEE 802.11 Infrastructure Basic Service Set", Center for Pervasive Communications and Computing, Department of Electrical Engineering and Computer Science, The Henry Samueli School of Engineering, University of California, Irvine, 2007 IEEE, pp. 4512-4517.

Non-Final Office Action of Jan. 15, 2015 for U.S. Appl. No. 13/489,253, 10 pages.

* cited by examiner

| USED IN PREVIOUS CYCLE 520 | SATURATION 540 | ACTION FOR NEXT CYCLE 560 |
|---|---|---|
| NO | NO | NO RE-SIZE OF WINDOW X |
| NO | YES | RE-SIZE WINDOW X |
| YES | NO | RE-SIZE WINDOW X |
| YES | YES | RE-SIZE WINDOW X |

FIG. 5

Different PHY Rates

US 9,124,547 B2

SYSTEM AND METHOD FOR ENFORCING UPLINK WIRELESS MEDIUM USAGE IN WIRELESS NETWORKS

FIELD

The present disclosure relates to traffic management in a wireless local area network. In particular, the present disclosure relates to enforcing uplink airtime fairness across multiple groups of clients through one or more virtual access points in wireless networks.

BACKGROUND

Wireless digital networks, such as networks operating under the current Electrical and Electronics Engineers (IEEE) 802.11 standards, are spreading in their popularity and availability. With such popularity, however, come problems of enforcing airtime fairness for clients connected to an access point in a wireless network. With downlink transmissions, e.g., packet transmissions from an access point to a plurality of clients, the access point can detect and/or prevent unfair use of airtime by selectively dropping packets to reduce the downlink traffic load of certain clients. Nevertheless, airtime fairness is more difficult to achieve when uplink transmission is involved. This is because, in most wireless networks, a network device, such as an access point, cannot control the flow of client traffic transmissions. As a result, when a network device receives packet transmissions from multiple clients, it is possible for a particular client with a low quality wireless connection to the network device to take a disproportional percentage of airtime, and thereby deteriorate the link quality of the corresponding wireless transmission channel.

Controlling uplink airtime has conventionally been considered difficult, because it typically requires client-side control. Furthermore, client-side control is cumbersome, because (1) it often needs to install separate software on the client, and (2) it needs to be compatible with a diverse client software and hardware platforms. As a result, currently, there is no known ways of effectively enforcing uplink airtime fairness among multiple clients or virtual clients connected to a network device in a wireless network.

The Transmission Control Protocol (TCP) merely has a network congestion avoidance mechanism. Specifically, TCP maintains a congestion window, which limits the total number of unacknowledged packets that may be in transit end-to-end. The congestion window is increased after a connection is initialized and/or after a timeout. It starts with a low initial window size. Thereafter, for every packet acknowledged, the size of congestion window increases such that the congestion window effectively doubles for every round trip time (RTT). When the congestion window exceeds a threshold, a congestion avoidance mechanism is triggered. In the state of congestion avoidance, as long as non-duplicate acknowledgements are received, the congestion window is additively increased with every RTT. When a packet is lost, the likelihood of duplicate acknowledgments increases, and thus the network congestion avoidance mechanism reduces the size of congestion window accordingly. Nevertheless, the TCP congestion control does not address enforcement of wireless medium usage time policies.

BRIEF DESCRIPTION OF THE DRAWINGS

The present disclosure may be best understood by referring to the following description and accompanying drawings that are used to illustrate embodiments of the present disclosure.

FIG. 5 illustrates exemplary management of transmission window according to embodiments of the present disclosure.

DETAILED DESCRIPTION

In the following description, several specific details are presented to provide a thorough understanding. While the context of the disclosure is directed to enforcing uplink wireless medium usage mechanisms in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to traffic management in a wireless local area network. In particular, the present disclosure relates to enforcing uplink wireless medium usage in wireless networks.

In some embodiments, enforcement of wireless medium usage policies uses TCP's flow control mechanism. In other embodiments, enforcement of wireless medium usage policies can use TCP's congestion control mechanism. Specifically, the TCP windows may be re-sized for multiple streams based on the wireless medium usage time for clients and or virtual access points (VAP). Prior to encrypting and encapsulating network frames on the network device for the client, TCP acknowledgement (ACK) packets for all uplink flows are re-written at the VAP to reflect changed window sizes, thereby limiting the uplink traffic for each traffic flow. This approach can also be leveraged for improving the performance of downlink fairness control with TCP. Note that, in this case we can account for the wireless medium usage time used by both the TCP and UDP uplink flows, but using our mechanism we can only limit TCP flows based on aggregate uplink wireless medium usage time.

With the solution provided herein, the disclosed network device determines usage limits associated with one or more client devices. The client devices transmit packets to the network device via one or more wireless uplinks. The disclosed network device further collects wireless medium usage times associated with the client devices, and calculates a size for transmission windows corresponding to the client devices based on the wireless medium usage times and the usage limits. The transmission windows can be TCP advertisement windows for traffic congestion controls whose size determines the rate of transmission permitted from the client devices to the network device. Then, the disclosed network device sets the transmission window to the calculated size to enforce uplink wireless medium usage policies among the client devices.

Computing Environment

Figure 1:
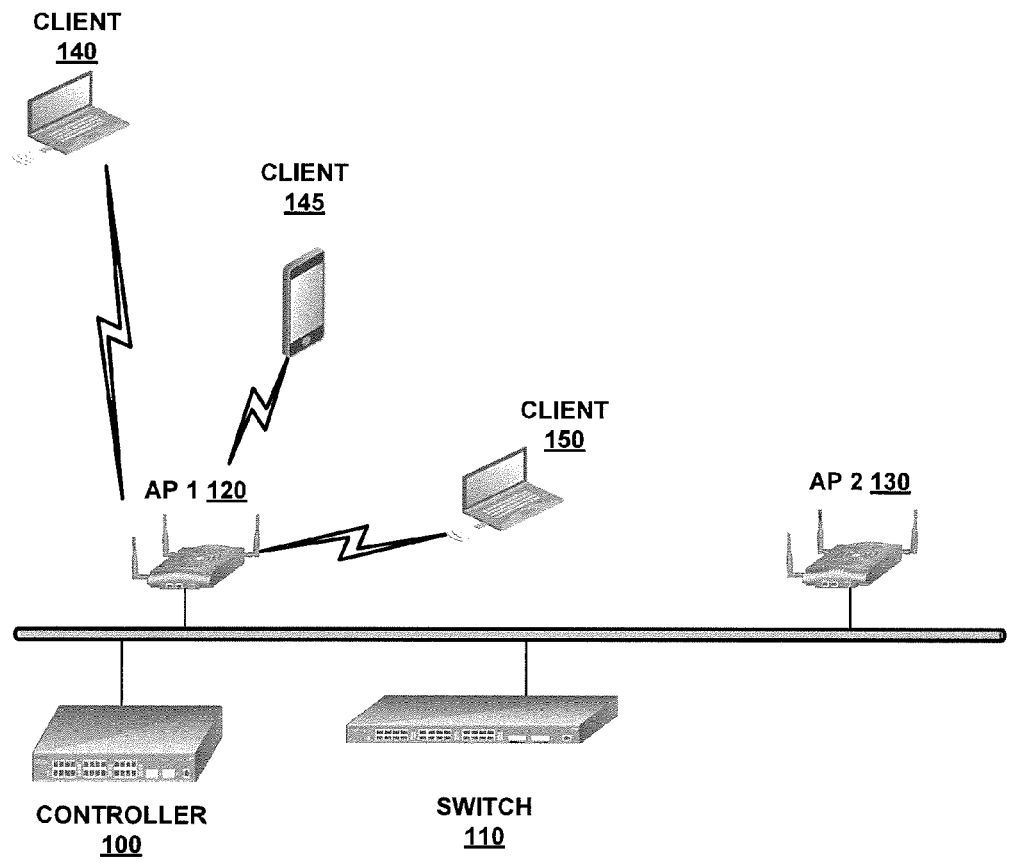
FIG. 1 is a diagram illustrating an exemplary wireless network environment according to embodiments of the present disclosure.

FIG. 1 shows an exemplary wireless digital network environment according to embodiments of the present disclosure. FIG. 1 includes a switch 110 and/or a controller 100 that connects to a plurality of network devices, such as access points AP1 120 and AP2 130, in a wireless network. Moreover, a network device may be connected to multiple client devices via wireless or wired connections. For example, as illustrated in FIG. 1, AP1 120 is connected to client 140, client 145, and client 150 via wireless connections. Note that, some clients may be uplink clients, from which a network device receives packet transmissions; and, some clients may be downlink clients, to which a network device forward packet transmissions.

The network depicted in FIG. 1 may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers. Each network controller device may locate in a separate sub-network. The network controller may manage one or more other network devices, such as access points, within the same sub-network.

Assuming that, in this example, client 140 and client 145 are uplink clients and client 150 is a downlink client. During operations, a wireless station, such as, client 140 or client 145, is associated with its corresponding access point, e.g., access point AP1 120. Further, assuming that, client 140 has a poor link quality on its connection with AP1 120, and thereby utilizing a high airtime percentage to send traffic to AP1 120. As a result, client 145, which maintains a good link quality on its connection with AP1 120, is deprived of its fair percentage of airtime for its transmissions to AP1 120.

Figure 2A:
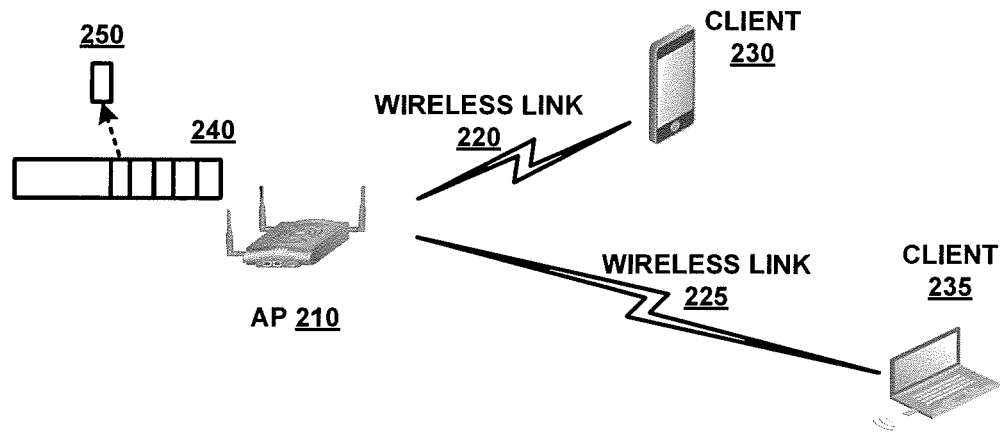
FIGS. 2A-2B are diagrams illustrating exemplary downlink and uplink wireless medium usage scenarios according to embodiments of the present disclosure.
Figure 2B:
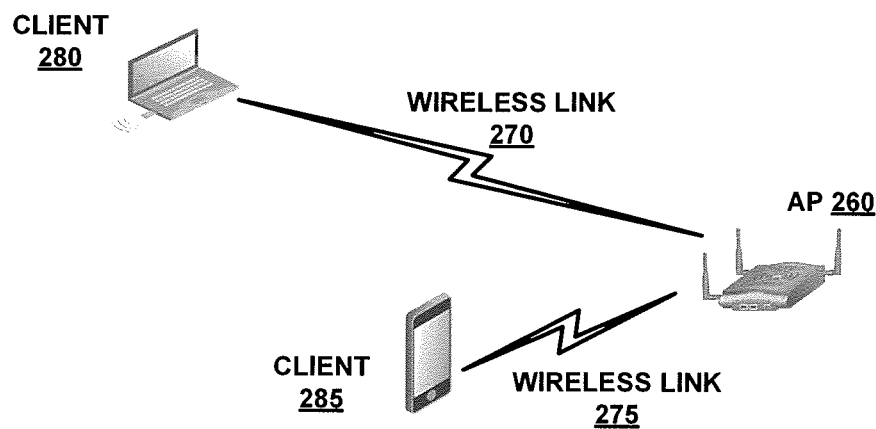

FIGS. 2A-2B are diagrams illustrating exemplary downlink and uplink airtime fairness scenarios. Specifically, in FIG. 2A, AP 210 is connected to client 230 via wireless link 220 and client 235 via wireless link 225. To prevent a client with poor link quality to occupy disproportional airtime, AP 210 may maintain queue 240 to regulate downlink packet transmissions to clients 230 and 235. Packets to client 230 and client 235 will be placed in queue 240 prior to being transmitted to the corresponding clients. If, for example, wireless link 225 between client 235 and AP 210 becomes deteriorated, the number of packets to client 235 that are buffered in queue 240 will increase accordingly. When this number increases beyond a predetermined threshold, AP 210 may determine to drop one or more packets to be transmitted to client device 235 (and possibly client device 230), such as packet 250, out of queue 240. The dropped packets will not be transmitted to their corresponding clients by AP 210. Thus, the sender of the dropped packet will not receive an acknowledgment for the packet, and can choose to retransmit the packet at a later time if needed. Therefore, by adjusting the predetermined threshold, AP 210 may improve the fair wireless medium usage distribution among all downlink clients or virtual access points.

FIG. 2B illustrates the scenario for uplink packet transmissions. In this example, AP 260 is connected to client 280 via wireless link 270 and client 285 via wireless link 275. Assuming that, client 280 is physically located far away from AP 260 and thus suffers from a poor link quality. Even if AP 260 maintains a queue, it will unlikely to help prevent unfair wireless medium usage distribution among uplink clients, such as client 280 and client 285. This is because packets may be lost during transmission when the link quality is poor and may not be queued by AP 260. Moreover, by the time, AP 260 detects that the number of queued packets transmitted from a specific client, e.g., client 280, has exceeded a predetermined number, client 280 likely has already been consuming a disproportional large percentage of wireless medium usage time.

Wireless Medium Usage Enforcement at Multiple Hierarchical Levels

Figure 3:
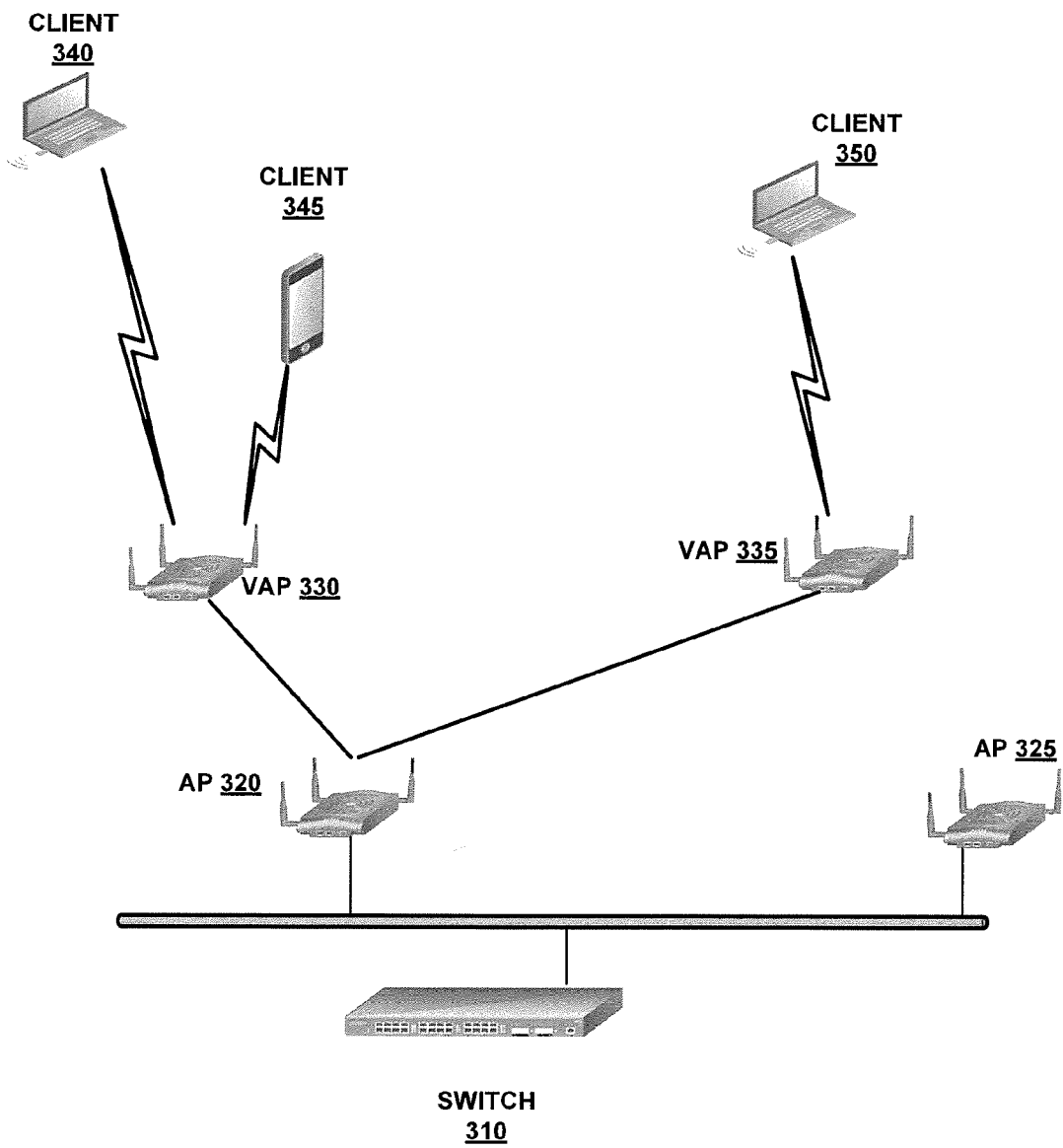
FIG. 3 illustrates an alternative exemplary wireless network environment according to embodiments of the present disclosure.

FIG. 3 illustrates an alternative exemplary wireless network environment according to embodiments of the present disclosure. In the illustrated example, wireless medium usage policies may be enforced across multiple hierarchical levels.

Specifically, FIG. 3 includes switch 310 that is connected to a plurality of access points (AP), such as AP 320 and AP 325. In addition, each AP can be connected to one or more virtual network devices, such as virtual access points (VAPs). For example, AP 320 is further connected to VAP 330 and VAP 335. Each virtual network device may be connected to multiple client devices. In the example illustrated in FIG. 3, VAP 330 is connected to client 340 and client 345; and, VAP 335 is connected to client 350.

Furthermore, assuming that, clients 340 and 345 are uplink TCP clients connected to VAP 330; and, client 350 is the uplink TCP client connected to virtual access point VAP 335. According to some embodiments of the present disclosure, a first level of wireless medium usage quota limitations may be enforced across network devices belonging to a first hierarchical level, such as AP 320 and AP 325. For example, AP 320 may be subject to 80% of wireless medium usage limitation; and, AP 325 may be subject to 20% of wireless medium usage time limitation. Moreover, a second level of wireless medium usage quota limitations may be enforced across network devices belonging to a second hierarchical level, such as client 340, client 345, and client 350. For example, client 340 may be subject to 30% of wireless medium usage limitation; and, client 345 may be subject to 50% of wireless medium usage limitation. Thus, collectively, clients of VAP 330 will be subject to 80% of wireless medium usage limitation.

Note that, the sum of second level wireless medium usage time limitations by second level devices may not exceed the wireless medium usage time limitation for the corresponding first level network device. However, depending on the network policy configuration, the sum of second level wireless medium usage time limitations may be less or more than the airtime quota for the corresponding first level network device. In the example above, it is possible that client 340 is subject to 25% of wireless medium usage time limitation, and client 345 is subject to 45% of wireless medium usage time limitation. Also, it is possible that client 340 is subject to 35% of wireless medium usage time limitation, and client 345 is subject to 55% of wireless medium usage time limitation, although at any time, clients 340 and 345 collectively are still subject to 80% of wireless medium usage time limitation.

In some embodiments, when wireless medium usage time limitations are enforced at multiple hierarchical levels, one or more medium usage policies can be predefined for different groups at the same hierarchical levels. For example, in some embodiments, the wireless medium usage time of all client devices of the same group are restricted by scaling down their respective usage limits by the same factor. The scaling factor may be determined based at least in part on the usage limit for the group.

In some embodiments, different weights may be assigned to different client devices in the same group. If the group is subject to a usage limit, calculating mechanism 1290 of FIG. 12 will calculate a scaling factor for each client device in the group based on the weight assigned to each client device and the usage limit for the group. Specifically, the scaling factor may be proportional to the physical layer (layer 2 or L2 in OSI model) transmission rate. Thus, a client device that transmits packets to network device at a faster rate than another client device will be allowed more wireless medium usage. Hence, by allow more transmission time by faster devices, the uplink wireless medium will be used more effectively.

Transmission Window Size Management

A. Transmission Window Size Calculation

Figure 4:
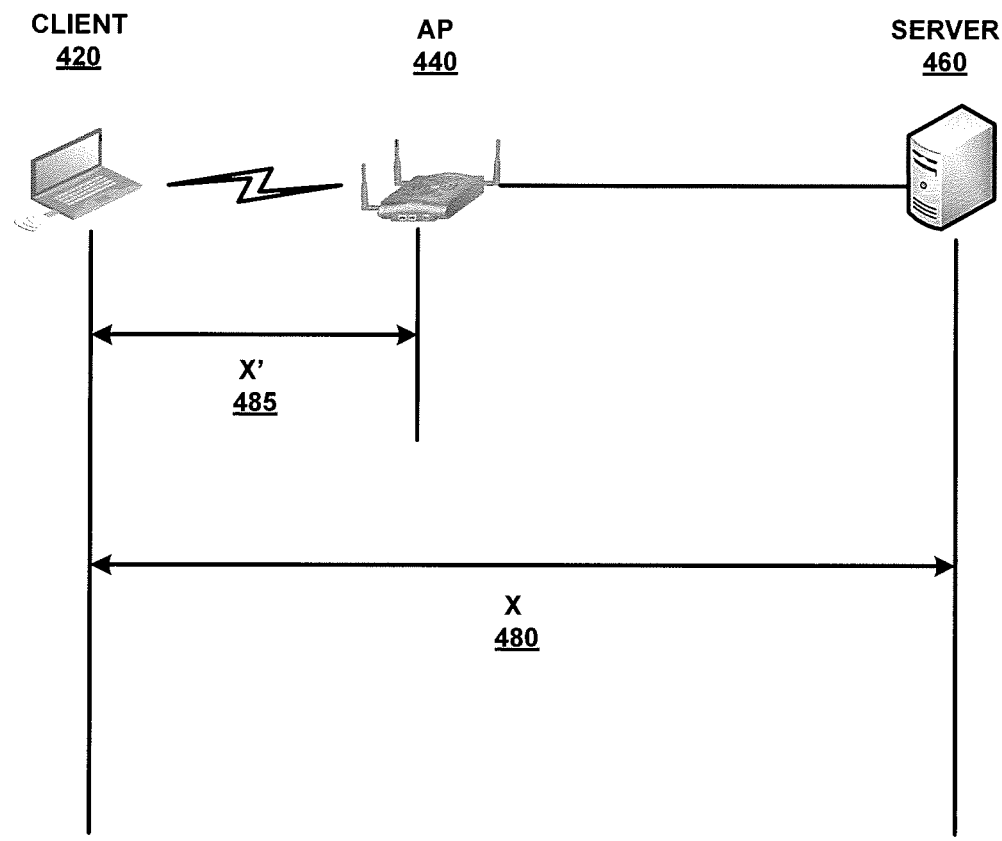
FIG. 4 illustrates exemplary management of transmission window according to embodiments of the present disclosure.

FIG. 4 illustrates exemplary management of transmission window according to embodiments of the present disclosure. FIG. 4 includes client 420, AP 440, and server 460. During operations, client 420 sends packet transmissions to server 460 through AP 440. X 480 indicates the end-to-end transmission capacity between client 420 and server 460. Also, X' 485 indicates the wireless transmission capacity between client 420 and AP 440. Note that, X' 485 may be less than X 480.

For each client device in the wireless network, the disclosed network device determines a corresponding value (e.g., $x_1$, $x_2$, $x_3$, etc.), which indicates the minimum medium usage time that the client device is guaranteed. The value may be configured by a network administrator or determined based on network administration policy configurations.

Moreover, the disclosed network device collects the actual wireless medium usage time (or wireless medium usage percentage) utilized by each client device in the wireless network. For example, assuming that, client 420 is configured with guaranteed wireless medium usage value $x_1$ and is utilizing $a_1$ amount of wireless medium usage time. Based on $x_1$ and $a_1$, the disclosed network device can determine a corresponding transmission window size $AW_1$. Note that, in some embodiments, wireless medium usage value $x_1$ is measured by percentage; wireless medium usage time $a_1$ is measured by seconds; and, transmission window size $AW_1$ is measured in bytes. Thereafter, the disclosed network device (e.g., access point AP 440) can adjust the TCP advertisement window size to $AW_1$. Consequently, the end-to-end transmission capacity X 480 will be lowered over time to approximate X' 485.

Specifically, to determine the transmission window size (e.g., TCP advertisement window size), the disclosed network device, based on feedback from the infrastructure, determines the wireless medium usage time $a(i,j)$ used by a client $C_i$, which is a direct or indirect uplink client connected to VAP(j). Thus, the aggregate total wireless medium usage time used per VAP(j) is: $A(j)=\text{sum}(a(i,j))$. Note that, in some embodiments, the UDP uplink wireless medium transmission time used across multiple VAPs has also been accounted for. Thus, the solution herein will penalize TCP uplink flows. In other embodiments, airtime fairness is maintained only across uplink TCP flows.

Next, the disclosed network device optionally determines whether the sum of utilized uplink wireless medium usage time across all clients or virtual clients (or virtual access points, VAPs) is approximate to a saturation level. For every client $C_{max}$, the disclosed network device determines if:

$$(a(i,j)-a\_resv(i,j))>\text{theta}(j) \qquad (a)$$

is true. Here, $a\_resv(i,j)$ is the reserved airtime quota for client $C_i$; theta(j) denotes the tolerance of difference in airtime for that VAP(j). If the value of $a\_resv(i,j)$ is not preset, then it can be calculated as theta(j) divided by the number of clients for that VAP.

If the condition (a) is satisfied for any client, the solution herein will reduce the TCP advertisement window $W(i,j)$, such that other clients are able to transmit enough traffic. Accordingly, the wireless medium usage time by the other clients will go up, and the wireless medium usage time $a(i,j)$ for client $C_i$ will go down.

More specifically, the new size of TCP advertisement window can be calculated as:

$$W(i,j)=\max(W(i,j)*(1-RD*(a(i,j)-a\_resv(i,j))),W\min(j))$$

$$W(i,j)=\max(W(i,j),AW(i,j)) \qquad (b)$$

Here, AW indicates the original advertised window size for the TCP session; $W_{min}$, indicates the minimum window size for flows belonging to VAP(j). In some embodiments, if this value is not preset, the default $W_{min}$, value is set to 1. The variable RD indicates the rate of correction, which determines the rate at which the TCP advertisement window sizes are decreased here. The RD could be set for a group of clients or virtual access points based on network configuration policy.

If, in the previous cycle, one or more windows $W(i,j)$ have been resized, then some flows can be given more width for using the available airtime. Accordingly, the TCP advertisement window size calculations can be performed as follows:

$$W(i,j)=\min(\text{round}(W(i,j)*(1+RI*(a\_resv(i,j)-a(i,j))), W\max(j))$$

$$W(i,j)=\min(W(i,j),AW(i,j)) \qquad (c)$$

Here, $W_{max}$ indicates the maximum window size for flows belonging to VAP(j). The variable RI indicates the rate of correction, which determines the rate at which the TCP advertisement window sizes are increased here. The RI could be set for a group of clients or virtual access points based on network configuration policy.

In some embodiments, a network administrator can set RI to be far less than RD for a deployment scenario, in which strict enforcement of airtime quotas with TCP flows is desirable. Hence, if none of the TCP advertisement windows were resized in the previous cycle, the network is not operating in saturation, and thus no window will be resized.

In some embodiments, only the window sizes of those flows which exceed their wireless medium usage time quota are reduced. Thus, there is fairness in wireless medium usage time across clients associated with a network device. In other embodiments, window sizes for all flows are scaled irrespective of the clients' current resource usage. Thus, the solution ensures that the wireless medium usage time quotas are not exceeded for each network device (e.g., VAP, AP, etc), but does not guarantee any fairness in wireless medium usage time across different clients.

B. Transmission Window Resizing Decision

FIG. 5 illustrate exemplary management of transmission window according to embodiments of the present disclosure. Specifically, FIG. 5 includes the following columns and/or fields: a column/field for used in previous cycle 520, a column/field for saturation state 540, and a column/field for action for next cycle. The wireless medium is considered to be operating in a saturation state when the attempted packet transmissions over the wireless medium is close to or exceeds the maximum transmission capacity of the wireless medium.

In this example, if the window X was not resized in the previous cycle, and the wireless medium is not operating in a saturation state, then the window X will not be resized during the next cycle.

If the window X was not resized in the previous cycle, but the wireless medium is operating in a saturation state, then the window X will be resized during the next cycle according to formula (b) described in the previous section.

If the window X was resized in the previous cycle, and the wireless medium is no longer operating in a saturation state, then the window X will be increased for some flows during the next cycle in order to give them more width for using the available airtime.

If the window X was resized in the previous cycle, and the wireless medium is still operating in a saturation state, then the window size will be checked and re-allocated during the next cycle according to formula (c) described in the previous section.

C. Results of Transmission Window Resizing

Figure 6A:
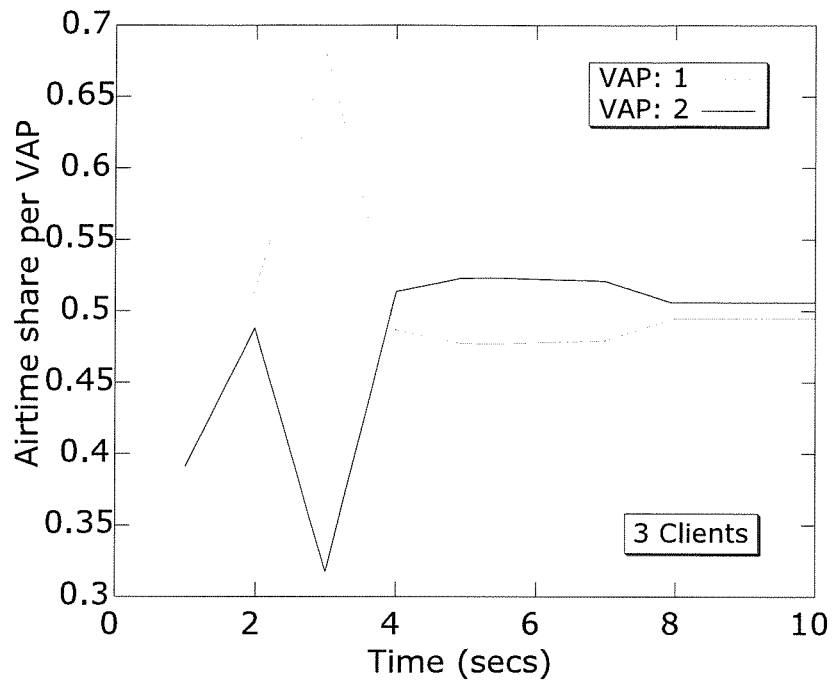
FIGS. 6A-6B are line charts illustrating exemplary performance results of enforcing uplink wireless medium usage according to embodiments of the present disclosure.
Figure 6B:
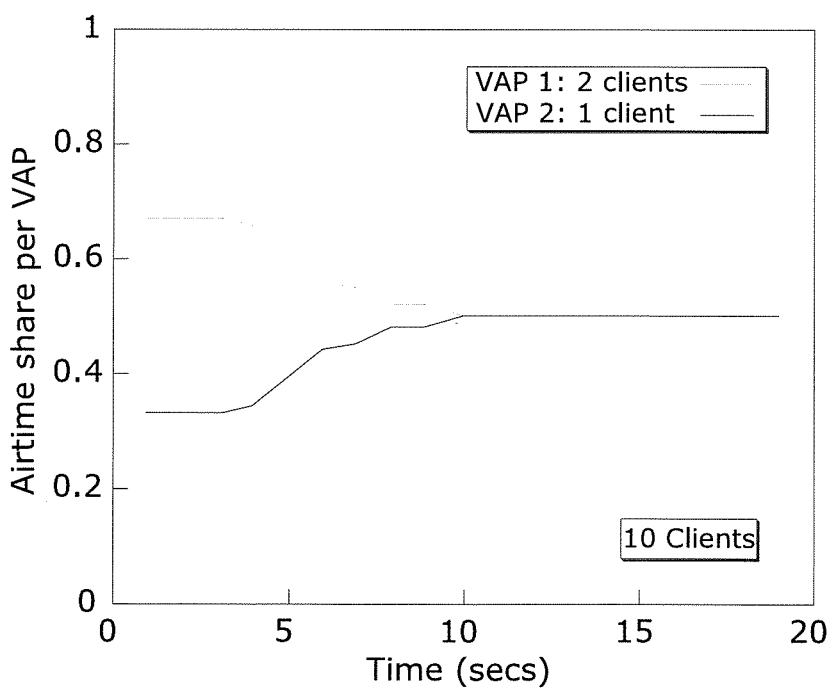

FIGS. 6A-6B are line charts illustrating exemplary performance results of enforcing uplink wireless medium usage according to embodiments of the present disclosure. FIG. 6A illustrates an experiment, whose setup consists of 3 clients associated with 2 network devices. The line chart illustrated in FIG. 6A shows baseline performance and the impact of changing certain system parameters.

Further, FIG. 6B illustrates another experiment, which include 10 clients associated with the 2 network devices. Thus, FIG. 6B shows performance results with more simultaneous TCP sessions. In this example, 9 clients are associated with the first network device, and 1 client is associated with the other network device.

As shown in FIGS. 6A-6B, the aggregate wireless medium usage time per network device is a function of simulation time. In these experiments, the initial window sizes are setup randomly. The adjustable parameters, including physical layer rates and packet sizes, are maintained across both network devices. Over a period of time, the wireless medium usage time across both network devices converges to approximately 50% quota allocated to each network device.

Figure 7:
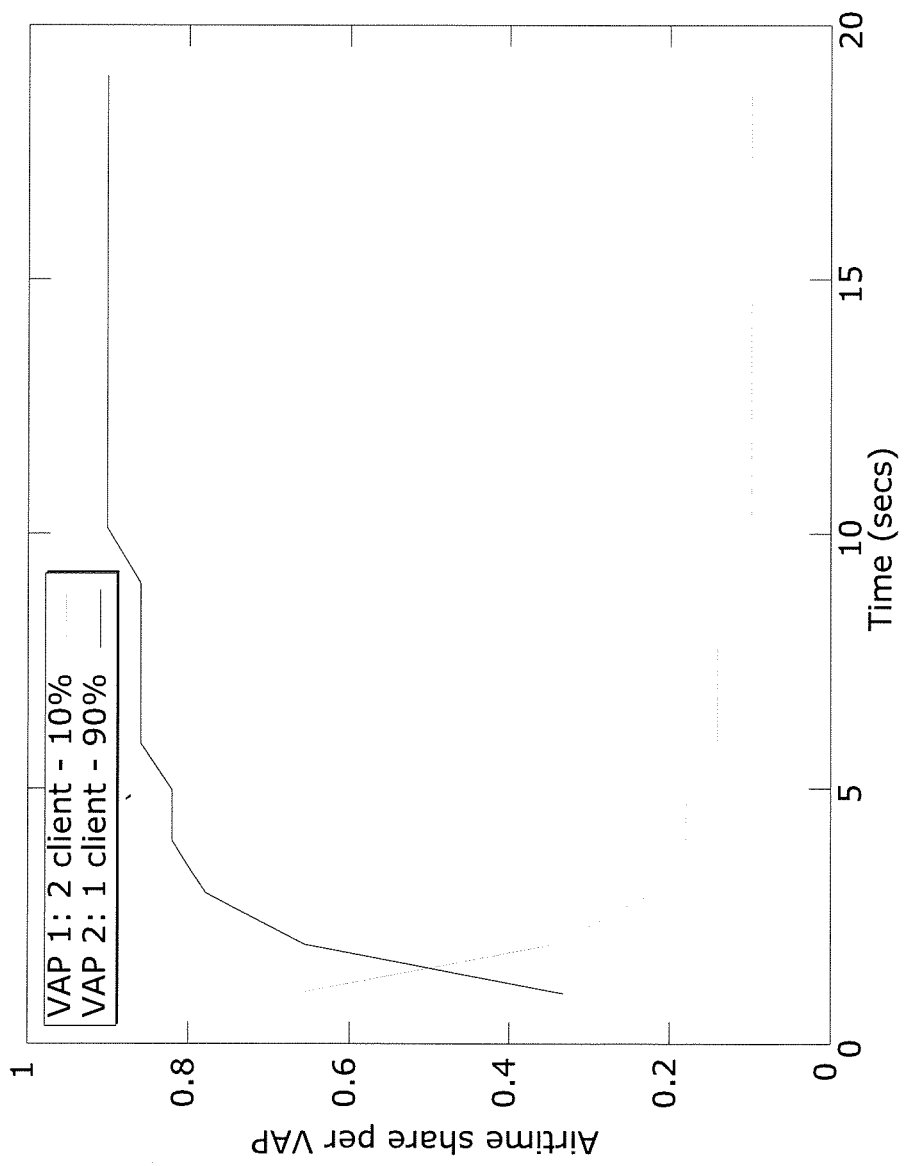
FIG. 7 is a line chart illustrating exemplary performance result of enforcing asymmetric uplink wireless medium usage according to embodiments of the present disclosure.

FIG. 7 is a line chart illustrating exemplary performance result of enforcing asymmetric uplink wireless medium usage policies according to embodiments of the present disclosure. In this experiment, the first network device has 2 associated clients; and, the second network device has 1 associated client. Also, 10% of airtime is allocated for the two clients associated with the first network device, while the remaining airtime is allocated for the single client associated with the second network device. As shown in FIG. 7, the aggregate usage for both network devices converges to their respective allocated quota as soon as the limitations are imposed after the beginning of the experiments.

Figure 8A:
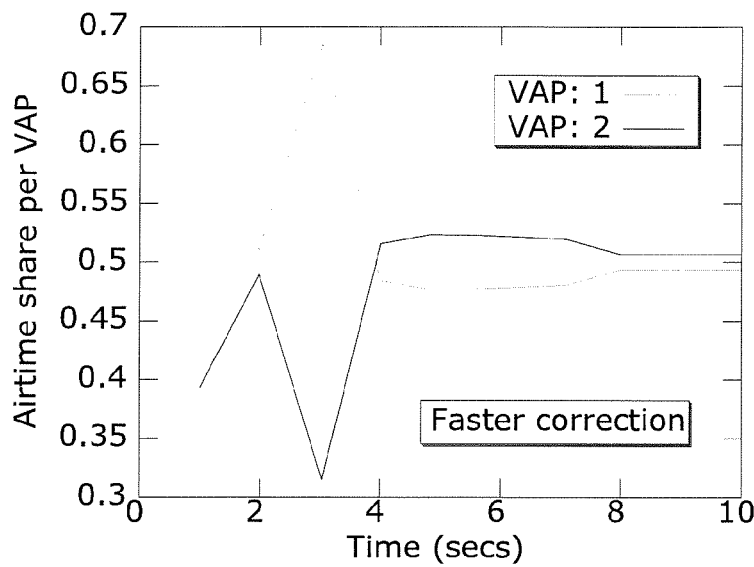
FIGS. 8A-8C are line charts illustrating exemplary performance results of enforcing uplink wireless medium usage under various rate of corrections according to embodiments of the present disclosure.
Figure 8B:
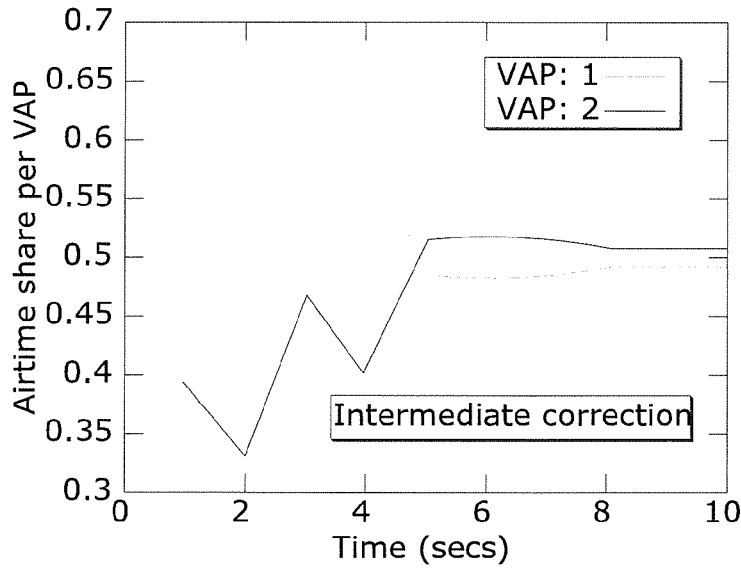
Figure 8C:
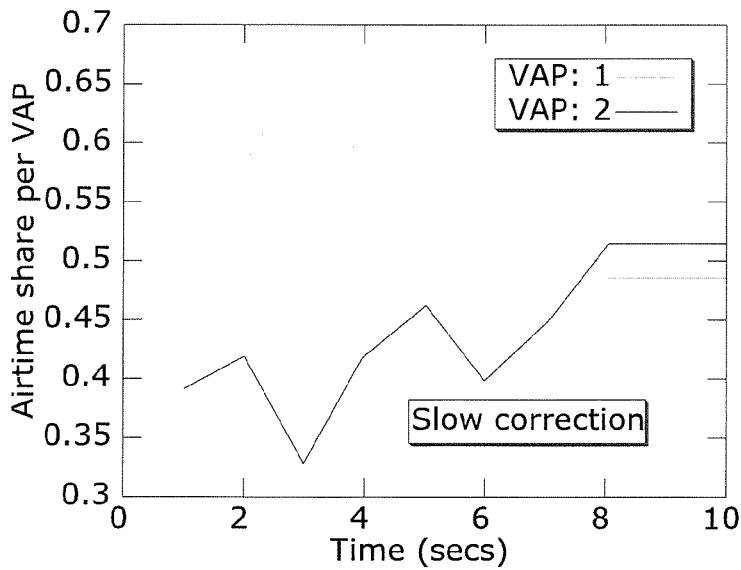

FIGS. 8A-8C are line charts illustrating exemplary performance results of enforcing uplink wireless medium usage policies under various rate of corrections according to embodiments of the present disclosure. In this set of embodiments, the rate of correction (e.g., RI and RD) is changed in each setup, and the performance with 10 clients is evaluated accordingly. As shown in FIGS. 8A-8C, when the correction rates are high, the oscillations are large. However, the airtime quotas self-correct quickly. When the correction rate is small, the oscillations are small, and thus, it takes a long time for airtime corresponding to different clients to converge to the pre-allocated quotas. Hence, an appropriate correction rate may be selected to balance the tradeoff between the degree of oscillations and the time period it takes for convergence to complete. In some embodiments, the correction rate could also be selected based on the number of clients sending uplink traffic, and thus allowing for performing better window scaling.

Figure 9:
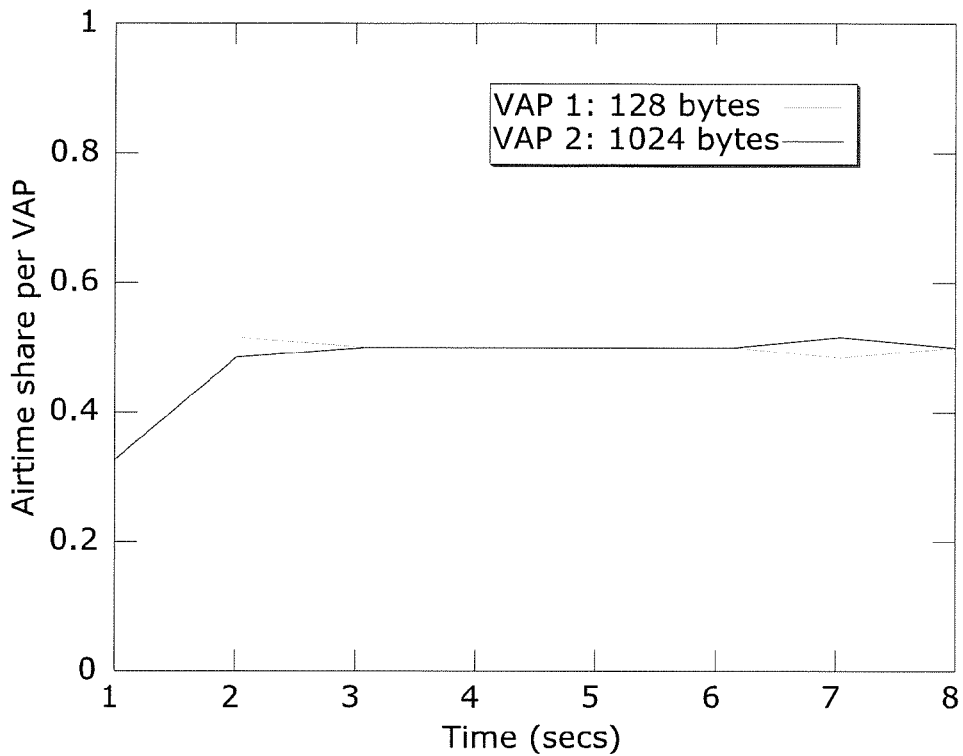
FIG. 9 is a line chart illustrating exemplary performance result of enforcing uplink wireless medium usage with different packet sizes according to embodiments of the present disclosure.

FIG. 9 is a line chart illustrating exemplary performance result of enforcing uplink wireless medium usage policies with different packet sizes according to embodiments of the present disclosure. In the embodiments illustrated in FIG. 9, two clients are connected to a first network device using packet sizes of 128 bytes, and a third client is connected to a second network device using a packet size of 1024 bytes. As shown in FIG. 9, the network is able to restrict wireless medium usage time of each respective network device (and its corresponding clients) to the pre-allocated quotas.

Figure 10:
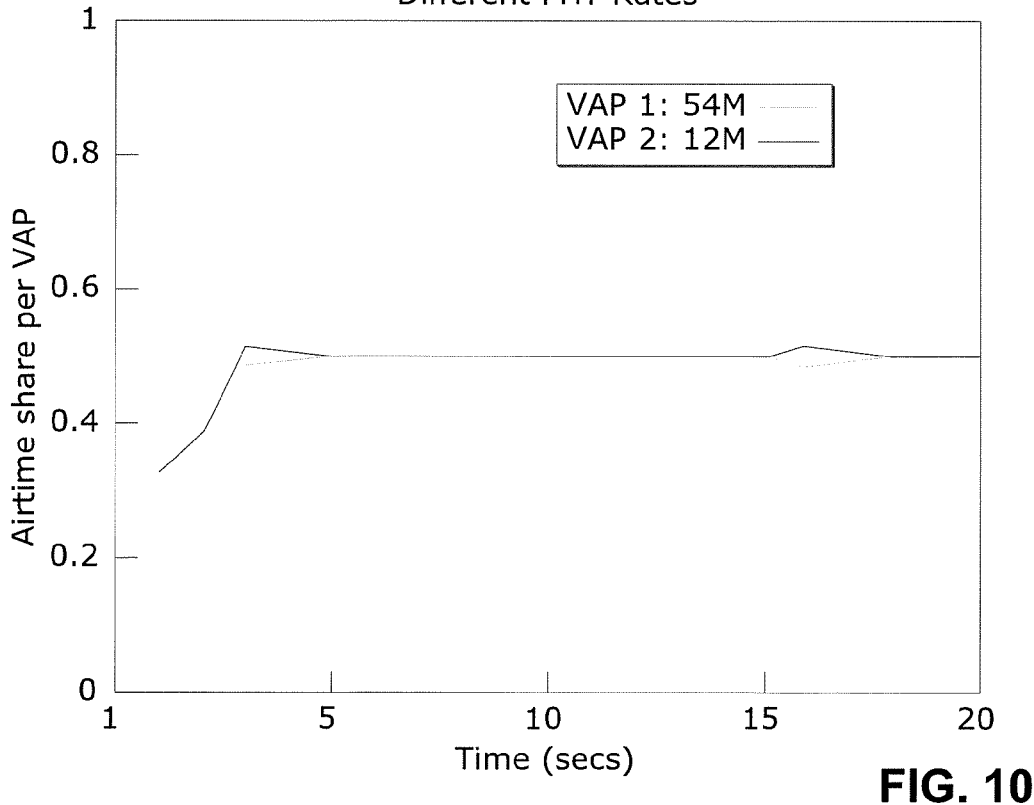
FIG. 10 is a line chart illustrating exemplary performance result of enforcing uplink wireless medium usage with different physical layer rates according to embodiments of the present disclosure.

FIG. 10 is a line chart illustrating exemplary performance result of enforcing uplink wireless medium usage policies with different physical layer rates according to embodiments of the present disclosure. To determine performance with different physical layer (PHY) rates, a network administrator can assign different PHY rates to clients connected to different network devices. For example, the network administrator may assign a PHY rate of 54M to the clients connected on a first virtual access point, and a PHY rate of 12M to the only client connected on a second virtual access point. As shown in FIG. 10, the network is able to restrict VAP wireless medium usage time to the pre-allocated quotas.

Process for Enforcing Uplink Wireless Medium Usage in Wireless Networks

Figure 11:
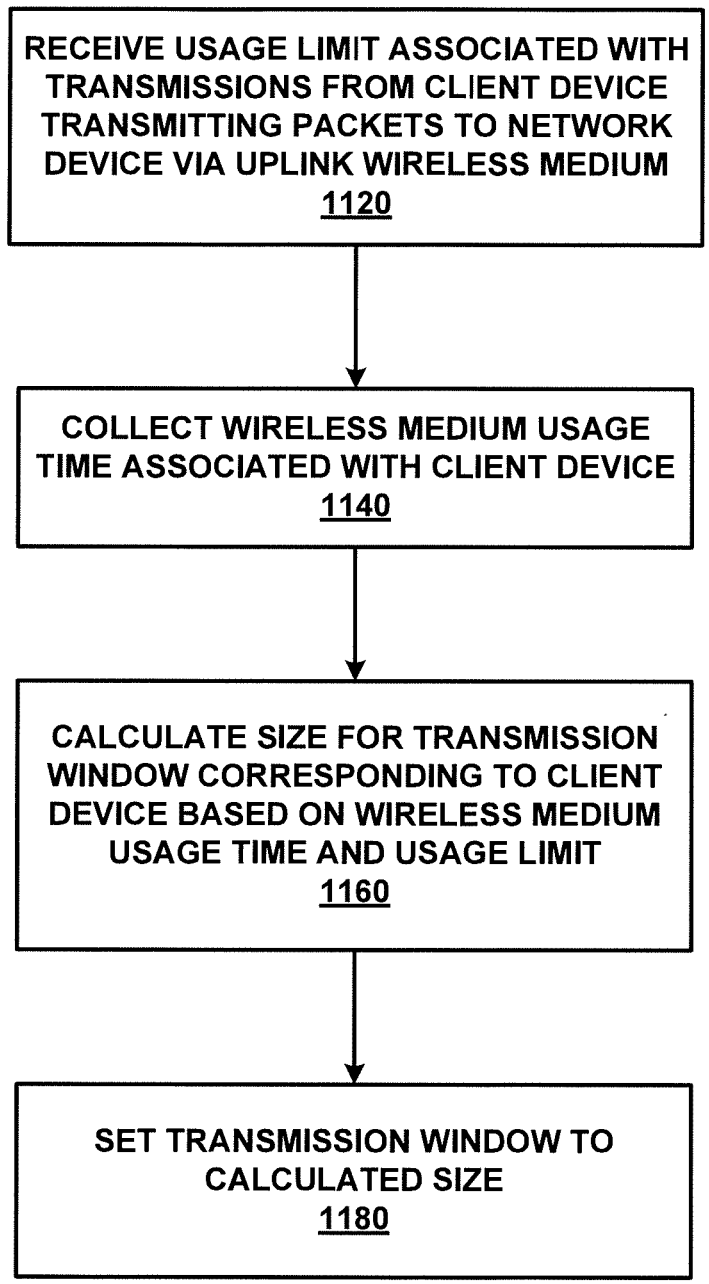
FIG. 11 is a flowchart illustrating enforcing uplink wireless medium usage according to embodiments of the present disclosure.

FIG. 11 is a flowchart illustrating enforcing uplink wireless medium usage in wireless networks according to embodiments of the present disclosure. During operations, the network device determines a usage limit associated with a client device (operation 1120). The client device transmits packets to the network device via an uplink wireless medium. The network device also collects wireless medium usage time associated with the client device (operation 1140). Furthermore, the network device calculates a size for a transmission window corresponding to the client device based on the wireless medium usage time and the usage limit (operation 1160). Next, the network device sets the transmission window to the calculated size to enforce wireless medium usage on the wireless uplink medium (operation 1180).

System for Enforcing Uplink Wireless Medium Usage in Wireless Networks

Figure 12:
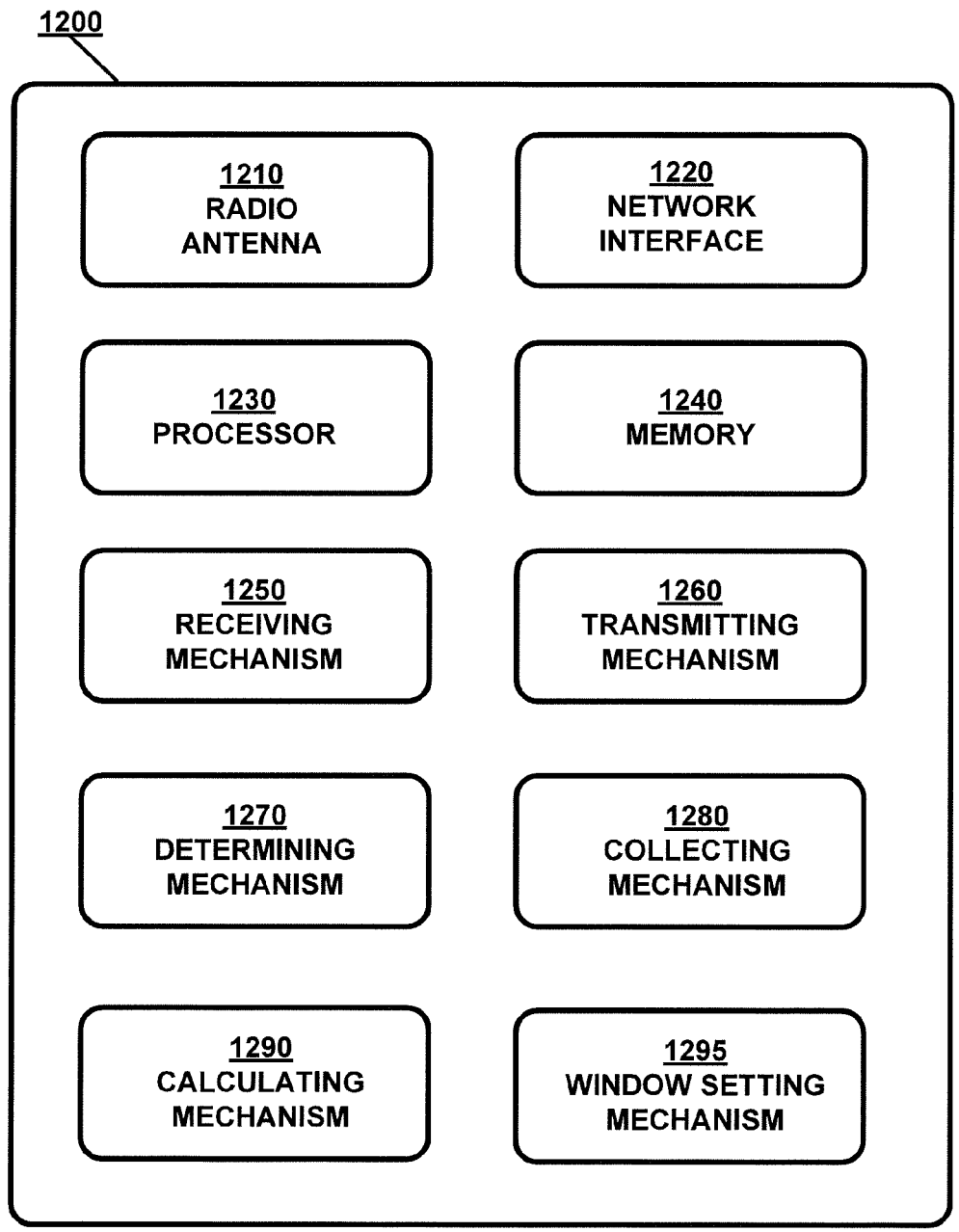
FIG. 12 is a block diagram illustrating enforcing uplink wireless medium usage according to embodiments of the present disclosure.

FIG. 12 is a block diagram illustrating a system for enforcing wireless medium usage in wireless networks according to embodiments of the present disclosure.

Network device 1200 includes at least one or more radio antennas 1210 capable of either transmitting or receiving radio signals or both, a network interface 1220 capable of communicating to a wired or wireless network, a processor 1230 capable of processing computing instructions, and a memory 1240 capable of storing instructions and data. Moreover, network device 1200 further includes a receiving mechanism 1250, a transmitting mechanism 1260, a determining mechanism 1270, a collecting mechanism 1280, a calculating mechanism 1290, and a scaling mechanism 1295, all of which are coupled to processor 1230 and memory 1240 in network device 1200. Network device 1200 may be used as a client system, or a server system, or may serve both as a client and a server in a distributed or a cloud computing environment.

Radio antenna 1210 may be any combination of known or conventional electrical components for receipt of signaling, including but not limited to, transistors, capacitors, resistors, multiplexers, wiring, registers, diodes or any other electrical components known or later become known.

Network interface 1220 can be any communication interface, which includes but is not limited to, a modem, token ring interface, Ethernet interface, wireless IEEE 802.11 interface, cellular wireless interface, satellite transmission interface, or any other interface for coupling network devices.

Processor 1230 can include one or more microprocessors and/or network processors. Memory 1240 can include storage components, such as, Dynamic Random Access Memory (DRAM), Static Random Access Memory (SRAM), etc.

Receiving mechanism 1250 generally receives one or more network messages via network interface 1220 or radio antenna 1210 from a wireless client. The received network messages may include, but are not limited to, requests and/or responses, beacon frames, management frames, control path frames, and so on. Each message may comprise one or more data packets, for example, in the form of IP packets.

In some embodiments, receiving mechanism 1250, receives a usage limit associated with transmissions from a client device, whereas the client device transmits packets to the network device via a wireless medium. In some embodiments, receiving mechanism 1250 can receive usage limits associated with multiple client devices or virtual access points, where the client devices or virtual access points transmit packets to the network device via uplink wireless mediums. Note that, the client device can be a virtual access point in communication with multiple client devices. Each client device is a wireless uplink client to the virtual access point.

Moreover, in some embodiments, the usage limit indicates a minimum amount of wireless medium usage time that the client device is guaranteed to use. On the other hand, the wireless medium usage time indicates the actual amount of wireless medium usage time by the client device. The wireless medium usage time may include one or more of Transmission Control Protocol (TCP) uplink wireless medium usage time and User Datagram Protocol (UDP) uplink wireless medium usage time.

In some embodiments, the client devices or virtual clients are from the same level in a hierarchical network structure. In other embodiments, the client devices and virtual access points are from different levels in the hierarchical network structure.

Transmitting mechanism 1260 generally transmits messages, which include, but are not limited to, requests and/or responses, beacon frames, management frames, control path frames, and so on.

Determining mechanism 1270 generally determines whether the wireless medium is operating in a saturation state, and whether there is a previous action performed upon the transmission window. If the network is not operating in a saturation state and no setting the transmission window is performed, determining mechanism 1270 determines that the transmission window is not to be reset in a next cycle. On the other hand, if the wireless medium is operating in the saturation state or if the previous action includes setting the transmission window, determining mechanism 1270 then determines that the transmission window is to be reset in the next cycle. The wireless medium is considered to be operating in a saturation state when the attempted packet transmissions over the wireless medium is close to or exceeds the maximum transmission capacity of the wireless medium.

Collecting mechanism 1280 generally collects wireless medium usage time data associated with client devices. The client devices or virtual access points transmit packets to the network device via uplink wireless mediums. Note that, the client device can be a virtual access point in communication with multiple client devices. Each client device is a wireless uplink client to the virtual access point.

Calculating mechanism 1290 generally calculates a size for a transmission window corresponding to a client device based at least on the wireless medium usage time and the usage limit for the corresponding client device. In some embodiments, calculating mechanism 1290 may calculate the size for the transmission window corresponding to a client device based on the wireless medium usage times and the usage limits corresponding to multiple client devices to provide airtime fairness for the client devices. In some embodiments, calculating mechanism 1290 may calculate size for the transmission window corresponding to multiple client devices at different levels in a hierarchical network structure.

Window setting mechanism 1295 generally sets the transmission window to enforce uplink wireless medium usage among uplink client devices or virtual access points in wireless networks. In some embodiments, the transmission window can be a TCP advertisement window whose size determines a rate of transmissions permitted over the wireless medium. Moreover, less wireless medium usage time is permitted after the TCP advertisement window size is decreased for a corresponding client device; and, more wireless medium usage time is permitted after the TCP advertisement window size is increased for a corresponding client device.

Furthermore, window setting mechanism 1295 can set the transmission window at a predetermined rate of correction, wherein the rate of correction determines the rate at which the transmission window size increases or decreases.

In some embodiments, window setting mechanism 1295 sets the transmission window for a client device to the calculated size only if the wireless medium usage time exceeds the usage limit. In other embodiments, window setting mechanism 1295 scales the transmission window for a client device to the calculated size regardless of whether the wireless medium usage time exceeds the usage limit.

Therefore, receiving mechanism 1250, transmitting mechanism 1260, determining mechanism 1270, collecting mechanism 1280, calculating mechanism 1290, and window setting mechanism 1295 often collectively operate with each other to enforce uplink wireless medium usage in wireless networks. For example, in some embodiments, receiving mechanism 1250 receives a plurality of usage limits associated with transmissions from the plurality of client devices groups; collecting mechanism 1280 collects a plurality of wireless medium usage times associated with the plurality of client devices groups; and calculating mechanism 1290 calculates the sizes for the transmission windows corresponding to transmission sessions from a group of client devices based at least on the plurality of usage limits, the plurality of wireless medium usage times associated with the groups, and a medium usage policy predefined for the group.

The medium usage policy predefined for the group can be defined in a variety of ways. For example, in some embodiments, the wireless medium usage time of all client devices of the same group are restricted by scaling down their respective usage limits by the same factor. The scaling factor may be determined based at least in part on the usage limit for the group.

In some embodiments, different weights may be assigned to different client devices in the same group. If the group is subject to a usage limit, calculating mechanism 1290 will calculate a scale factor for each client device in the group based on the weight assigned to each client device and the usage limit for the group. Specifically, the scale factor may be proportional to the physical layer (layer 2 or L2 in OSI model) transmission rate. Thus, a client device that transmits packets to network device 1200 at a faster rate than another client device will be allowed more wireless medium usage in order to ensure that the uplink wireless medium is used effectively.

According to embodiments of the present disclosure, network services provided by wireless network device 1200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A computer-implemented method, comprising:
   obtaining, by a network device on a wireless network, a reserved airtime quota for a client device, wherein the reserved airtime quota indicates a guaranteed minimum amount of usage time associated with the network device;

determining a medium usage time for the client device, wherein the medium usage time indicates a current amount of usage time associated with the network device over a predetermined period of time;

determining whether a difference between the medium usage time and the reserved airtime quota for the client device exceeds a tolerance limit for the network device;

obtaining a rate of correction, wherein the rate of correction is determined when the difference between the medium usage time and the reserved airtime quota for the client device exceeds the tolerance limit, and wherein the rate of correction indicates a limit by which a transmission window size for the client device can be changed between network transmissions;

calculating a transmission window size value for the client device using the reserved airtime quota, the medium usage time, and the rate of correction; and setting the transmission window size for the client device to the calculated transmission window size value.

2. The computer-implemented method of claim 1, further comprising:

obtaining an additional reserved airtime quota for an additional client device;

determining an additional medium usage time for the additional client device, wherein the additional medium usage time indicates a current amount of usage time associated with the network device; and calculating the transmission window size value for the client device using the additional reserved airtime quota and the additional medium usage time.

3. The computer-implemented method of claim 1, wherein the transmission window size is associated with a Transmission Control Protocol advertisement window that controls a rate of transmissions permitted over the network device.

4. The computer-implemented method of claim 1, wherein the network device is in communication with a plurality of client devices, and wherein the plurality of client devices have corresponding reserved airtime quotas.

5. The computer-implemented method of claim 1, wherein medium usage times include Transmission Control Protocol uplink medium usage time, User Datagram Protocol (UDP) uplink medium usage time, and downlink medium usage time.

6. The computer-implemented method of claim 1, wherein the transmission window size may be increased or decreased.

7. The computer-implemented method of claim 1, wherein the rate of correction is predetermined.

8. The computer-implemented method of claim 1, further comprising:

determining whether a previous action changed the transmission window size, wherein when the medium usage time is not within a threshold amount of the reserved airtime quota and the previous action did not change the transmission window size the transmission window size is not changed in a next transmission cycle, and when the medium usage time is within the threshold amount of the reserved airtime quota or the previous action changed the transmission window size, the transmission window size is changed in the next transmission cycle.

9. A network device, comprising:

one or more processors;

one or more computer readable storage mediums containing instructions to cause the one or more processors to perform operations including:

obtaining, by the network device on a wireless network, a reserved airtime quota for a client device, wherein the reserved airtime quota indicates a guaranteed minimum amount of usage time associated with the network device;

determining, by the network device on the wireless network, a medium usage time for the client device, wherein the medium usage time indicates a current amount of usage time associated with the network device over a predetermined period of time;

determining, by the network device on the wireless network, whether a difference between the medium usage time and the reserved airtime quota for the client device exceeds a tolerance limit for the network device;

obtaining, by the network device on the wireless network, a rate of correction, wherein the rate of correction is determined when the difference between the medium usage time and the reserved airtime quota for the client device exceeds the tolerance limit, and wherein the rate of correction indicates a rate at which a transmission window size for the client device is can be changed between network transmissions;

calculating, by the network device on the wireless network, a transmission window size value for the client device using the reserved airtime quota, the medium usage time, and the rate of correction; and setting, by the network device on the wireless network, the transmission window size for the client device to the calculated transmission window size value.

10. The network device of claim 9, containing further instructions to cause the one or more processors to perform operations including:

obtaining an additional reserved airtime quota for an additional client device;

determining an additional medium usage time for the additional client device, wherein the additional medium usage time indicates a current amount of usage time associated with the network device; and calculating the transmission window size value for the client device using the additional reserved airtime quota and the additional medium usage time.

11. The network device of claim 9, wherein the transmission window size is associated with a Transmission Control Protocol advertisement window that controls a rate of transmissions permitted over the network device.

12. The network device of claim 9, wherein the network device is in communication with a plurality of client devices, and wherein plurality of client devices have corresponding reserved airtime quotas.

13. The network device of claim 9, wherein medium usage times include Transmission Control Protocol uplink medium usage time, User Datagram Protocol (UDP) uplink medium usage time, and downlink medium usage time.

14. The network device of claim 9, wherein the transmission window size may be increased or decreased.

15. The network device of claim 9, wherein the rate of correction is predetermined.

16. The network device of claim 9, containing further instructions to cause the one or more processors to perform operations including:

determining whether a previous action changed the transmission window size, wherein when the medium usage time is not within a threshold amount of the reserved airtime quota and the previous action did not change the transmission window size the transmission window size is not changed in a next transmission cycle, and when the medium usage time is within the threshold amount of the reserved airtime quota or the previous action changed the transmission window size, the transmission window size is changed in the next transmission cycle.

17. A non-transitory computer program product, tangible embodied in a non-transitory machine readable storage medium, including instructions operable to cause a data processing apparatus to:
   obtain a reserved airtime quota for a client device, wherein the reserved airtime quota indicates a guaranteed minimum amount of usage time associated with the network device;
   determine a medium usage time for the client device, wherein the medium usage time indicates a current amount of usage time associated with the network device over a predetermined period of time;
   determine whether a difference between the medium usage time and the reserved airtime quota for the client device exceeds a tolerance limit for the network device;
   obtain a rate of correction, wherein the rate of correction is determined when the difference between the medium usage time and the reserved airtime quota for the client device exceeds the tolerance limit, and wherein the rate of correction indicates a rate at which a transmission window size for the client device can be changed between network transmissions;
   calculate a transmission window size value for the client device using the reserved airtime quota, the medium usage time, and the rate of correction; and
   set the transmission window size for the client device to the calculated transmission window size value.

18. The non-transitory computer program product of claim 17, including further instructions operable to cause a data processing apparatus to:
   obtain an additional reserved airtime quota for an additional client device;
   determine an additional medium usage time for the additional client device, wherein the additional medium usage time indicates a current amount of usage time associated with the network device; and
   calculate the transmission window size value for the client device using the additional reserved airtime quota and the additional medium usage time.

19. The non-transitory computer program product of claim 17, wherein the transmission window size is associated with a Transmission Control Protocol advertisement window that controls a rate of transmissions permitted over the network device.

20. The non-transitory computer program product of claim 17, wherein the network device is in communication with a plurality of client devices, and wherein plurality of client devices have corresponding reserved airtime quotas.

21. The non-transitory computer program product of claim 17, wherein medium usage times include Transmission Control Protocol uplink medium usage time, User Datagram Protocol (UDP) uplink medium usage time, and downlink medium usage time.

22. The non-transitory computer program product of claim 17, wherein the transmission window size may be increased or decreased.

23. The non-transitory computer program product of claim 17, wherein the rate of correction is predetermined.

24. The non-transitory computer program product of claim 17, including further instructions operable to cause a data processing apparatus to:
   determine whether a previous action changed the transmission window size, wherein when the medium usage time is not within a threshold amount of the reserved airtime quota and the previous action did not change the transmission window size the transmission window size is not changed in a next transmission cycle, and when the medium usage time is within the threshold amount of the reserved airtime quota or the previous action changed the transmission window size, the transmission window size is changed in the next transmission cycle.

* * * * *